US010565786B1

(12) United States Patent
Klein et al.

(10) Patent No.: US 10,565,786 B1
(45) Date of Patent: Feb. 18, 2020

(54) SENSOR PLACEMENT INTERFACE

(71) Applicant: Google LLC, Mountain View, CA (US)

(72) Inventors: Greg Klein, Cupertino, CA (US); James Bruce, Sunnyvale, CA (US); Arshan Poursohi, Berkeley, CA (US)

(73) Assignee: Google LLC, Mountain View, CA (US)

( * ) Notice: Subject to any disclaimer, the term of this patent is extended or adjusted under 35 U.S.C. 154(b) by 355 days.

(21) Appl. No.: 15/198,042

(22) Filed: Jun. 30, 2016

(51) Int. Cl.
*G06T 17/05* (2011.01)
*G06T 15/20* (2011.01)
*G06T 15/08* (2011.01)
*G06F 3/0482* (2013.01)
*G06F 3/0481* (2013.01)
*G06T 17/00* (2006.01)

(52) U.S. Cl.
CPC ............ *G06T 17/05* (2013.01); *G06F 3/0482* (2013.01); *G06F 3/04815* (2013.01); *G06T 15/08* (2013.01); *G06T 15/20* (2013.01); *G06T 17/005* (2013.01); *G06T 2210/56* (2013.01)

(58) Field of Classification Search
CPC ....... G06T 17/05; G06T 7/0046; G06T 15/08; G06T 15/20; G06T 17/005; G06T 2210/56; G06F 3/04815; G06F 3/0482
See application file for complete search history.

(56) References Cited

U.S. PATENT DOCUMENTS

| 7,006,889 | B2 | 2/2006 | Mathur et al. | |
|---|---|---|---|---|
| 2007/0136408 | A1* | 6/2007 | Wheeler | G01S 17/89 708/290 |
| 2008/0007720 | A1 | 1/2008 | Mittal | |
| 2008/0078865 | A1 | 4/2008 | Burne | |
| 2008/0181487 | A1* | 7/2008 | Hsu | G06K 9/3241 382/154 |
| 2012/0039526 | A1* | 2/2012 | Garaas | G06T 17/05 382/154 |

(Continued)

OTHER PUBLICATIONS

Schaufler, G., and Jensen, H.W. (2000) "Ray tracing point sampled geometry". Rendering Techniques 2000. Eds. Peroche and Rushmeier, Springer-Verlag, pp. 319-328. (Year: 2000).*

(Continued)

*Primary Examiner* — Barry Drennan
*Assistant Examiner* — Khoa Vu
(74) *Attorney, Agent, or Firm* — McDonnell Boehnen Hulbert & Berghoff LLP

(57) ABSTRACT

An example method includes determining a point cloud representation of surfaces within an environment. The method further includes providing for display of a graphical interface that shows a model of the surfaces within the environment based on the point cloud representation. The method additionally includes receiving input data indicating one or more positions for one or more virtual sensors on the graphical interface corresponding to one or more physical positions within the environment. The method also includes determining one or more occluded regions within the environment, where the one or more occluded regions are predicted to be occluded from view by one or more sensors positioned at the one or more physical positions within the environment. The method also includes providing for display in the graphical interface of a graphical representation of the one or more occluded regions within the model of the surfaces within the environment.

20 Claims, 12 Drawing Sheets

(56) References Cited

U.S. PATENT DOCUMENTS

| | | | | |
|---|---|---|---|---|
| 2013/0215115 A1* | 8/2013 | Jenkins | ............... | G06T 15/20 345/420 |
| 2013/0300740 A1* | 11/2013 | Snyder | ............... | G06F 3/016 345/420 |
| 2014/0191938 A1* | 7/2014 | Ybanez Zepeda | ...... | G06F 3/017 345/156 |
| 2014/0225771 A1* | 8/2014 | Phuyal | ............... | G01S 17/023 342/357.28 |
| 2015/0009214 A1* | 1/2015 | Lee | ............... | G06T 17/10 345/420 |
| 2015/0062117 A1* | 3/2015 | Reitmayr | ............... | G06T 15/00 345/419 |
| 2016/0142679 A1 | 5/2016 | Miyoshi et al. | | |
| 2016/0189421 A1* | 6/2016 | Haimovitch-Yogev | ............... | G06T 15/205 345/626 |
| 2018/0075643 A1* | 3/2018 | Sequeira | ............ | G01C 21/206 |

OTHER PUBLICATIONS

Samet, H. (1989). Implementing ray tracing witth octrees and neighbor finding. Computers & Graphics, 13, 445-460. (Year: 1989).*

Eleonora Belli, et al., Monitoring the Robot Workspace With Multiple Depth Sensors, pp. 1-8.

* cited by examiner

SENSOR PLACEMENT INTERFACE

BACKGROUND

Physical spaces may be used for retail, manufacturing, assembly, distribution, and office spaces, among others. Over time, the manner in which these physical spaces are designed and operated is becoming more intelligent, more efficient, and more intuitive. As technology becomes increasingly prevalent in numerous aspects of modern life, the use of technology to enhance these physical spaces becomes apparent. Therefore, a demand for such systems has helped open up a field of innovation in sensing techniques, data processing, as well as software and user interface design.

SUMMARY

Example systems and methods may allow for display of occluded regions within a graphical interface. More specifically, a point cloud representation of surfaces within a space may first be determined. A graphical interface may then be displayed showing a model of the surfaces within the environment. The interface may allow for the placement of one or more virtual sensors. Based on the chosen positions of the virtual sensors and the point cloud representation of the space, one or more regions predicted to be occluded from view by the sensors may be determined. An indication of the occluded regions may be displayed on the graphical interface.

In one aspect, a method is provided. The method includes determining a point cloud representation of surfaces within an environment. The method further includes providing for display of a graphical interface that shows a model of the surfaces within the environment based on the point cloud representation. The method additionally includes receiving input data indicating one or more positions for one or more virtual sensors on the graphical interface corresponding to one or more physical positions within the environment. The method further includes determining, based on the point cloud representation of the surfaces of the environment, one or more occluded regions within the environment, where the one or more occluded regions are predicted to be occluded from view by one or more sensors positioned at the one or more physical positions within the environment. The method additionally includes providing for display in the graphical interface of a graphical representation of the one or more occluded regions within the model of the surfaces within the environment.

In another aspect, a system is provided that includes a display device, one or more processors, and a non-transitory computer-readable medium. The non-transitory computer-readable medium may be configured to store instructions, that when executed by the one or more processors, cause the computing system to perform functions including determining a point cloud representation of surfaces within an environment. The functions further include providing for display on the display device of a graphical interface that shows a model of the surfaces within the environment based on the point cloud representation. The functions additionally include receiving input data indicating one or more positions for one or more virtual sensors on the graphical interface corresponding to one or more physical positions within the environment. The functions also include determining, based on the point cloud representation of the surfaces of the environment, one or more occluded regions within the environment, where the one or more occluded regions are predicted to be occluded from view by one or more sensors positioned at the one or more physical positions within the environment. The functions further include providing for display in the graphical interface of a graphical representation of the one or more occluded regions within the model of the surfaces within the environment.

In yet another aspect, a non-transitory computer-readable medium is provided having stored therein instructions, that when executed by a computing system, cause the computing system to perform functions. The functions include determining a point cloud representation of surfaces within an environment. The functions further include providing for display on the display device of a graphical interface that shows a model of the surfaces within the environment based on the point cloud representation. The functions additionally include receiving input data indicating one or more positions for one or more virtual sensors on the graphical interface corresponding to one or more physical positions within the environment. The functions also include determining, based on the point cloud representation of the surfaces of the environment, one or more occluded regions within the environment, where the one or more occluded regions are predicted to be occluded from view by one or more sensors positioned at the one or more physical positions within the environment. The functions further include providing for display in the graphical interface of a graphical representation of the one or more occluded regions within the model of the surfaces within the environment.

In yet another aspect, another system is provided. The system includes means for determining a point cloud representation of surfaces within an environment. The system further includes means for providing for display of a graphical interface that shows a model of the surfaces within the environment based on the point cloud representation. The system additionally includes means for receiving input data indicating one or more positions for one or more virtual sensors on the graphical interface corresponding to one or more physical positions within the environment. The system further includes means for determining, based on the point cloud representation of the surfaces of the environment, one or more occluded regions within the environment, where the one or more occluded regions are predicted to be occluded from view by one or more sensors positioned at the one or more physical positions within the environment. The system additionally includes means for providing for display in the graphical interface of a graphical representation of the one or more occluded regions within the model of the surfaces within the environment.

These as well as other aspects, advantages, and alternatives will become apparent to those of ordinary skill in the art by reading the following detailed description, with reference where appropriate to the accompanying drawings.

DETAILED DESCRIPTION

Figure 1:
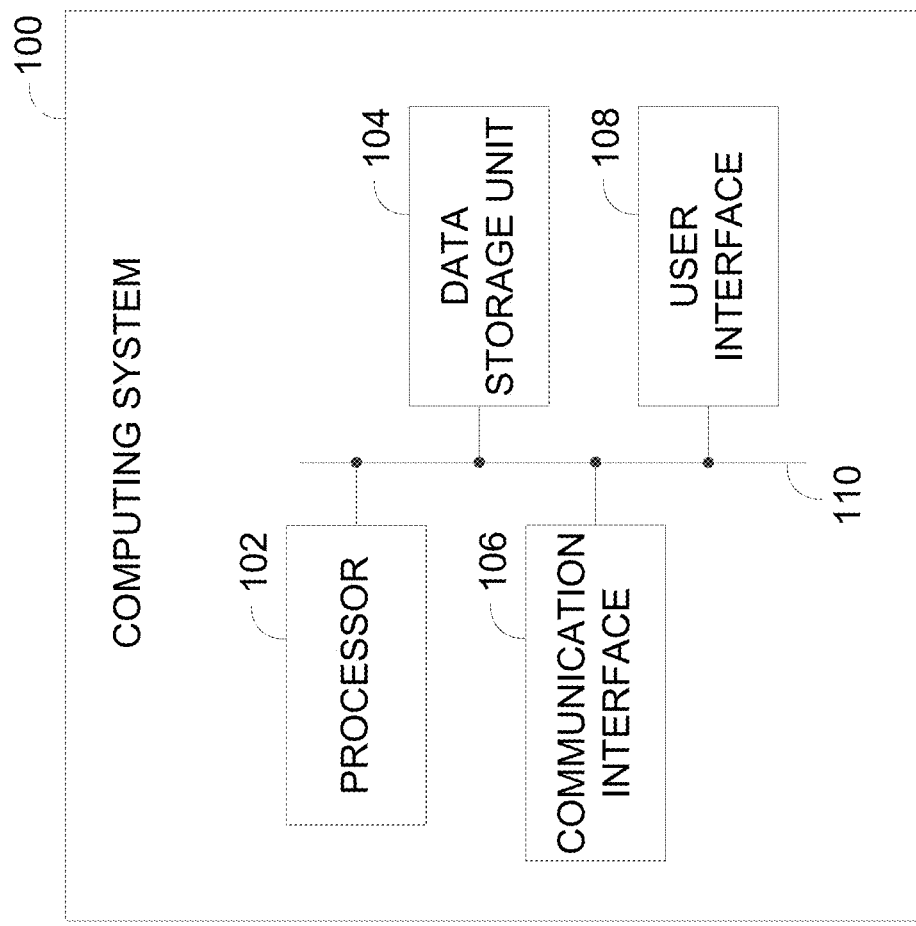
FIG. 1 is a simplified block-diagram of a computing system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

A space may be equipped with sensors for a variety of applications, including security, analytics, and other types of applications for which data about the space collected over time may be useful. As an example, the space may be a building in which manufacturing operations are performed. Sensor data from sensors fixed within the building may be used to determine information about the state of products under construction, materials used in the construction, and actors performing construction operations. In some examples, the sensors may be depth sensors such as laser-based Lidar sensors which can produce a global point cloud representation of the space. Such a point cloud representation may be used to determine locations of objects moving in the space by identifying changes in the point cloud over time.

In some cases, a set of fixed sensors within a space may not be able to collect data representing the entire space due to occlusions. In particular, fixed structures in the space, such as furniture, walls, or display screens may occlude or block the sensors from viewing certain areas within the space. Occlusions may make it difficult for a computing system receiving data from the sensors to accurately monitor positions of objects moving in the space. For instance, an occlusion near a doorway of a space may cause the computing system to miss an object exiting or entering the space.

Accordingly, it may be advantageous to choose positions for sensors within a space to avoid occlusions. However, it may not be readily apparent to a manager of a space (e.g., a warehouse manager) how to best position a group of ten or twenty sensors given the particular locations and shapes of fixed structures within the space. According to example embodiments, a user interface may be provided that simulates occluded areas to facilitate decisions about where to place sensors within a space. In particular, the interface may display a graphical representation of predicted occluded areas in a space for a given placement of virtual sensors selected by a user.

In order to simulate occluded areas, a point cloud representation of an environment may first be determined. In some examples, a high resolution model of the space may be generated. For instance, one or more high resolution sensors may be moved through the space in order to build up a dense point cloud representation of the background features of the space. By generating a high resolution point cloud, occluded areas may be predicted with greater accuracy. In one example, a model may be generated from sensor data collected from one or more sensors on a robot that navigates through the space. The robot may be equipped with a more expensive and precise sensor than the sensors to be installed within the space. The high resolution model may then be updated over time when additional sensor data is collected indicating one or more changes to the background of the space (e.g., when a piece of furniture is moved).

The interface may display a model of the space based on the point cloud representation. For instance, the model may be an overhead two-dimensional visual representation of surfaces in the environment. In another example, the model may be a three-dimensional model which allows a user to change a viewpoint to view surfaces making up the background of the space from different orientations. The interface may allow for the placement of one or more virtual sensors within the display corresponding to physical locations within the space. In some examples, the virtual sensors may represent Lidar sensors which detect depth within a full 360-degree range. In other examples, the sensors may have a limited field of view, in which case the interface may also allow orientations of the sensors to be specified.

A computing system may then use the point cloud representation of the space to simulate occluded regions for the selected placement of sensors. This process may involve dividing the volume of the space into voxels and casting virtual rays from locations of the sensors to center points of the voxels to determine whether each sensor has a view of different volumes within the space. Occlusions may be identified when the rays intersect surfaces in the space represented by the point cloud representation of the space.

Once the occluded regions are predicted, a graphical representation of the occluded regions may be displayed on the interface within the model of the surfaces in the space. The interface may therefore provide an intuitive representation of the coverage provided as virtual sensors are added, removed, or repositioned within the interface. The simulation may be performed within seconds, and may avoid costs associated with a trial-and-error process of physically installing the sensors at different locations to evaluate the coverage results with different arrangements of sensors.

In additional examples, one or more physical sensors may be installed in the space. A computing system may receive sensor data from the one or more physical sensors, and may then update the interface based on the actual received data. In particular, the displayed model of surfaces within the space and/or the representation of occluded regions may be updated based on the data collected from the installed sensor(s). The updated display may be used as part of an iterative process to help a user determine where to place additional sensors within the space.

In other examples, the interface may provide suggested arrangements of sensors within a space. For instance, an arrangement may be determined that is expected to minimize the volume of occluded regions for a chosen number of sensors. In another example, a suggested arrangement may be designed to provide a certain minimum amount of coverage around entryways of the space. In a further example, the interface may allow for the selection of areas of interest. Suggested arrangements of sensors may then be provided to provide coverage around the selected areas.

In further examples, the interface may show overlapping regions for which multiple sensors have an unobstructed view. In additional examples, the interface may provide an indication of how many sensors can view respective regions within the space. Other types of information may be displayed as well or instead.

Referring now to the Figures, FIG. 1 is a simplified block-diagram of an example computing system 100 that can perform various acts and/or functions, such as those described in this disclosure. Computing system 100 can include various components, such as processor 102, data storage unit 104, communication interface 106, and/or user interface 108. The components of computing system 100 can be connected to each other (or to another device, system, or other entity) via connection mechanism 110. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless). Computing system 100 can include more or less components in other implementations.

Processor 102 may include a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing system 100 and the user of the computing device system.

Computing system 100 may be configured to analyze aspects of a space. For instance, computing system 100 may receive measurements from sensors positioned in various types of spaces, such as manufacturing facilities and distribution facilities. A sensor providing measurements to computing system 100 can be described as active. When the sensor stops providing measurement to computing system 100, the sensor may go offline, which may indicate that the sensor is no longer powered on and/or is operating erroneously, for example. As such, computing system 100 can use information provided by a variety of types of sensors, such as depth sensors, cameras, or gauges.

Example sensors can include motion-capture (Mocap) sensors, or Lidar sensors, generic force sensors, proximity sensors, motion sensors (e.g., an inertial measurement units (IMU), gyroscopes, and/or accelerometers), load sensors, position sensors, thermal imaging sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others. Sensors can have a fixed-stationary position in the space or can also operate in a non-stationary manner. For example, a robotic device can measure aspects of the space using sensors that capture data as the robotic device travels. Additionally, computing system 100 may also utilize a clock for time stamping incoming sensor data and information (e.g., information from devices in the space) in order to align information from different sensors or devices that correspond to the same time.

Computing system 100 can process different types of incoming sensor data. For instance, computing system 100 may determine point cloud representations of the space using data provided from one or more depth sensors positioned in the space. A point cloud representation of the space may have numerous data points in a coordinate system that correspond to surfaces of objects or structures in the space. Computing system 100 may use information provided by sensors to determine various information about objects in the space, including positions of objects, sizes, and in object recognition, for example. In some instances, computing system 100 may use measurements from sensors to determine a background representation that depicts the background of a space. For example, the background representation may resemble a point cloud representation that does not include data points depicting objects moving in the foreground in the space since the objects are not part of the fixed background.

Computing system 100 may also communicate with and/or control systems operating within a space, such as a lighting system or audio system. In some instances, computing system 100 can further provide instructions or requests to robotic devices or other computing devices positioned within or nearby the space.

Figure 2:
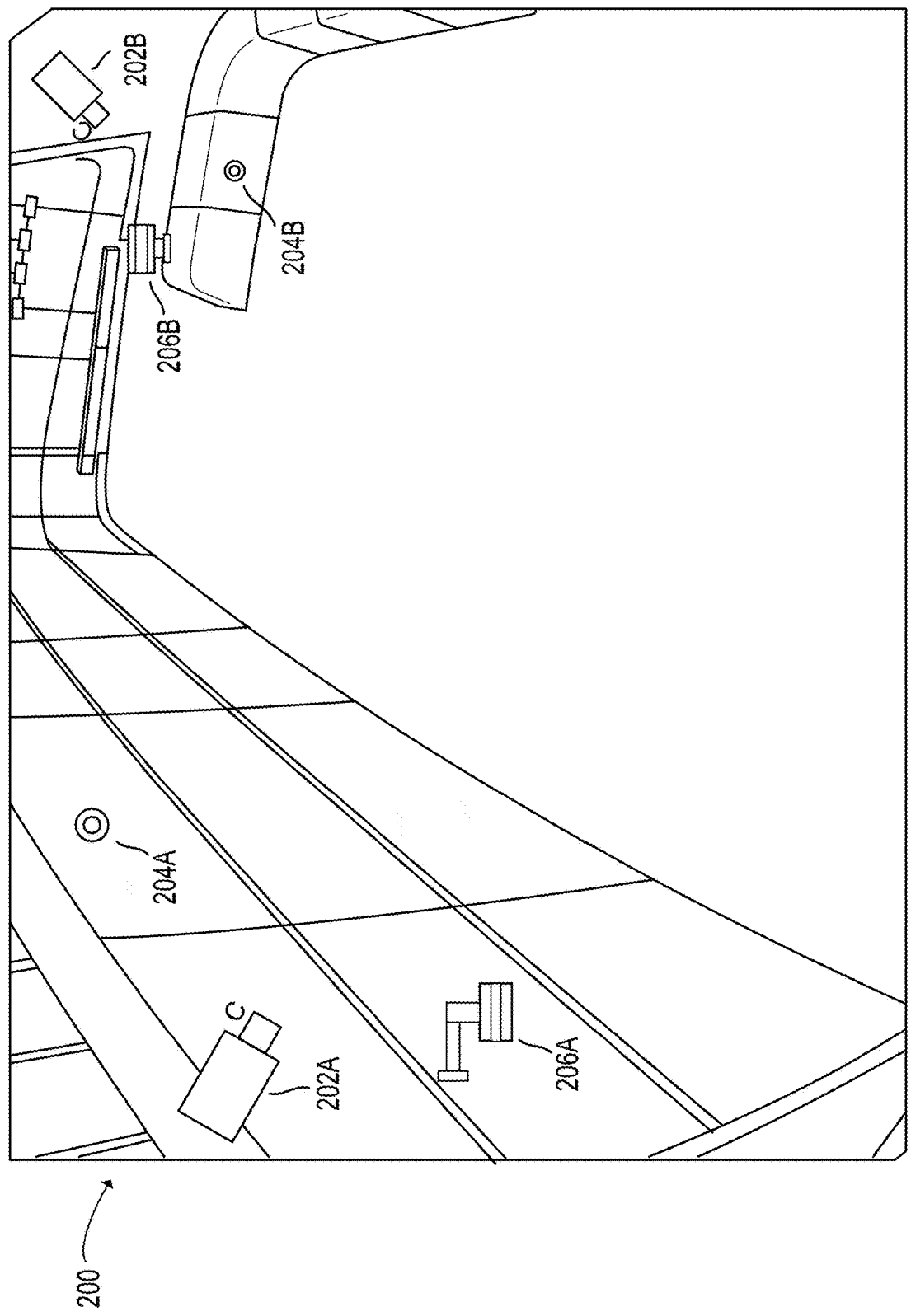
FIG. 2 depicts a space with fixed sensors, according to an example embodiment.

FIG. 2 depicts an example space 200 in which various types of sensors have been positioned. Space 200 is shown as a general space, but may correspond to types of indoor or outdoor environments, such as manufacturing facilities, distribution centers, or other possible locations. As shown, space 200 can include sensors, such as camera 202A, camera 202B, microphone 204A, microphone 204B, depth sensor 206A, and depth sensor 206B. In other examples, space 200 may include more or less sensors and positions of sensors may differ as well. For instance, space 200 may include a set of Lidar sensors (e.g., ten 360-degree Lidar sensors) having fixed positions in different areas of the space.

Various sensors, such as camera 202A and depth sensor 206A, can provide information to computing system 100 in a periodic and/or continuous manner via a wired and/or wireless connection. For instance, cameras 202A-202B may provide images and/or video of space 200 and may be configured to focus upon particular areas of space 200. As such, the various sensors in space 200 can provide different types information to computing system 100 for computing system 100 to use in order to perform operations, such as object detection of objects entering the space 200, leaving the space 200, and/or moving within the space 200.

Microphones 204A-204B can capture audio in space 200 and relay the audio information to computing system 100. As such, computing system 100 can use information provided by microphones 204A-204B for performing operations (e.g., detecting objects in space 200).

Space 200 can include depth sensors, such as depth sensors 206A-206B. The depth sensors can correspond to laser-based sensors (e.g., Lidar), camera-based sensors (e.g., stereo cameras), or other types of depths sensors. For instance, depth sensor 206A and depth sensor 206B may correspond to Lidar sensors having fixed positions in space 200 that can produce point clouds made up of data points (e.g., 60,000 data points) that represent the surfaces of nearby objects or structures (e.g., floors, walls) in space 200. As such, depth sensor 206A and depth sensor 206B may provide information to computing system 100 and/or may operate as a system to provide merged information (e.g., a merged point cloud) to computing system 100. In some instances, computing system 100 may receive information from depth sensor 206A and depth sensor 206B at the same time and merge the information and/or receive the information at staggered times. Computing system 100 may use various processes to merge and utilize information from sensors in space 200.

Computing system 100 may receive information from sensors and determine representations of space 200, such as a background representation depicting the background of space 200. For example, computing system 100 may receive information from depth sensors 206A-206B to determine a background representation of space 200. In another example, computing system 100 may receive and use point cloud data from depth sensor 206A and depth sensor 206B in addition to images from cameras 202A-202B to generate representations (e.g., a background representation) of space 200.

Figure 3:
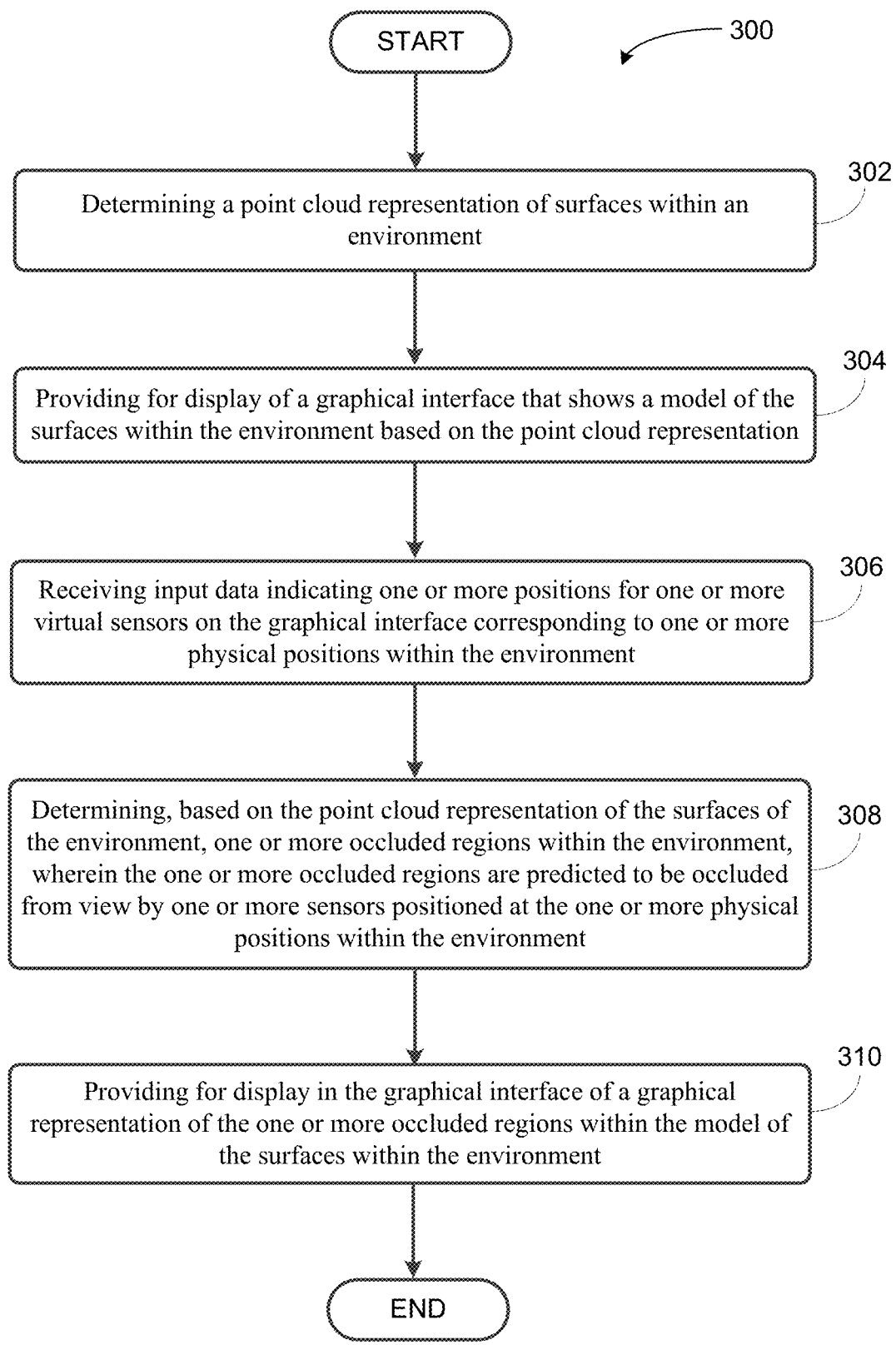
FIG. 3 is a block diagram of an example method, according to an example embodiment.

FIG. 3 illustrates a flowchart showing a method 300 that may allow for display of simulated occluded regions within a representation of a space, according to an example embodiment. Method 300 may be carried out using a display device, such as a tablet device, a smartphone, a head-mountable device (HMD), or a laptop computer. In some examples, method 300 may be executed by a local or remote control system of such a device. In further examples, method 300 may be performed by computing system 100 as illustrated and described with respect to FIGS. 1 and 2. The computing system 100 may optionally receive sensor data from one or more sensors in the space, such as cameras 202A-202B, microphones 204A-204B, and/or depth sensors 206A-206B. Other arrangements are also possible.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 involves determining a point cloud representation of surfaces within an environment. More specifically, the point cloud representation may contain points at three-dimensional coordinates that correspond to locations of surfaces within a space, such as walls, furniture, or other fixed or movable objects. In some examples, the point cloud may be determined from sensor data collected by one or more depth sensors. In further examples, the point cloud representation may be generated from sensor data collected at a time when the space is not expected to contain moving objects (e.g., before a factory opens). In this manner, the point cloud may represent surfaces that generally correspond to background surfaces that are expected to stay relatively stable over time.

Figure 4:
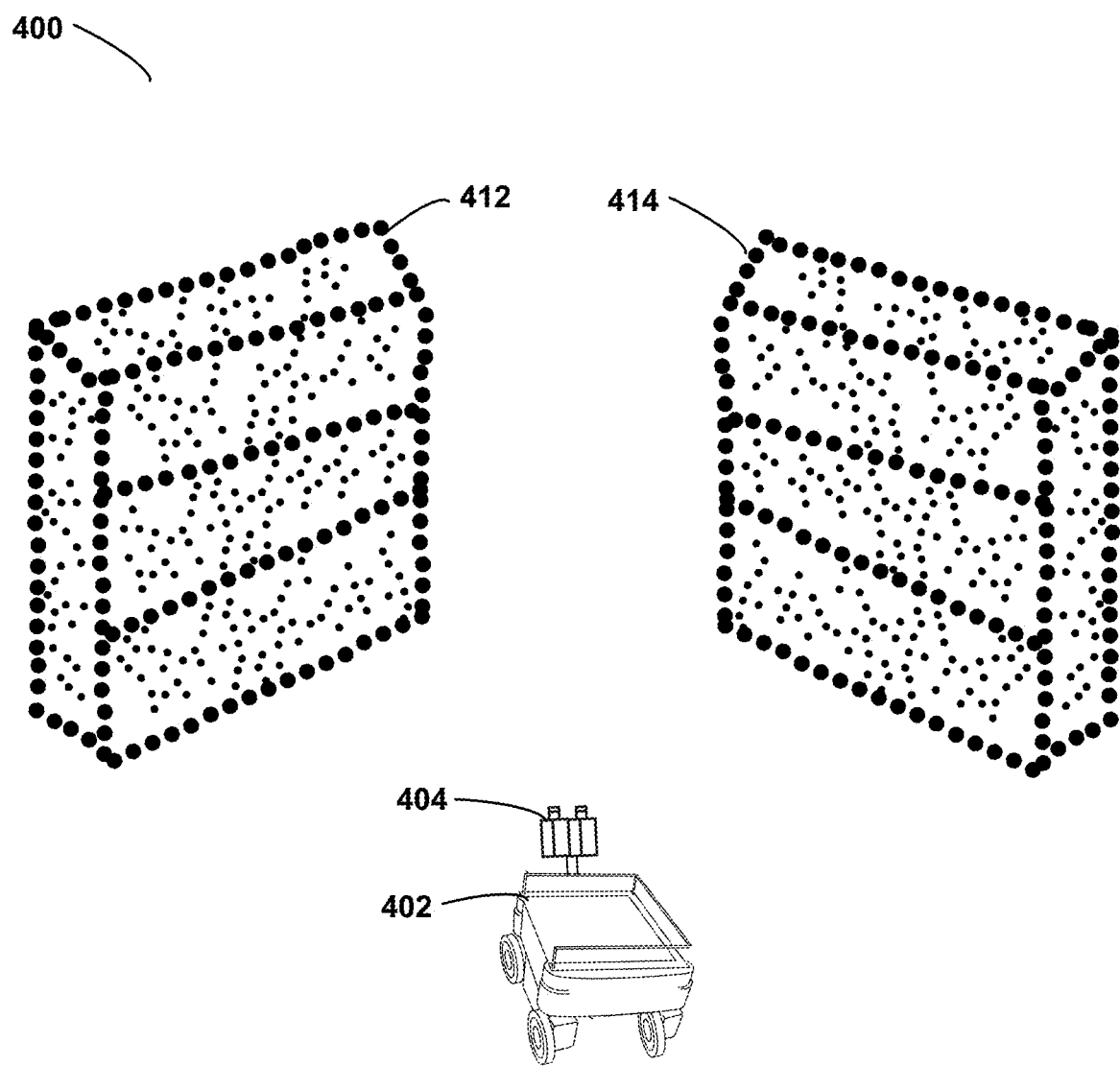
FIG. 4 illustrates a point cloud representation of a portion of an environment, according to an example embodiment.

FIG. 4 illustrates an example generation of a point cloud representation of a portion of a space using a robot, according to an example embodiment. More specifically, robot 402 may navigate through an environment 400 while collecting sensor data indicative of surfaces in the environment 400 from a sensor 402. Sensor 402 may be a depth camera, a Lidar sensor, a stereo camera, or a different type of sensor capable of producing depth information that may be used to generated a point cloud from data collected about surfaces in the environment 400.

By using a mobile robot 402, sensor data may be collected from different points of view to generate a dense and highly accurate point cloud. In particular, robot 402 may navigate around objects in the space, such as shelves 412 and 414 in order to collect different views of the objects. In other examples, one or more sensors may be moved through environment 400 in other ways, such as by a human actor. In further examples, one or more sensors temporarily or permanently fixed in the space may be used to help generate a point cloud as well or instead.

Generation of a dense point cloud may allow for precise predictions of occluded regions for different potential placements of sensors. Additionally, the point cloud may be updated when features in the environment are added, removed, or repositioned. For instance, if a piece of furniture is moved into the space, it may be identified as background, and points corresponding to surfaces on the piece of furniture may be added to the point cloud representation.

Referring back to FIG. 3, method 300 further involves providing for display of a graphical interface that shows a model of the surfaces in the environment based on the point cloud representation, as shown by block 304. More specifically, the graphical interface may be displayed on a display device, such as a laptop computer, a desktop computer, a touch-based device, an HMD, a cellular phone, or a camera screen. The graphical interface may allow for one or more types of user input, such as input data representative of screen touches, button clicks, or keyboard typing.

Computing functions may be provided that when executed, cause a model of surfaces in the environment to be displayed on a display screen. The model may include a graphical representation, which may be a two-dimensional (2D) representation, a three-dimensional (3D) representation, or a hybrid representation. The model may be generated on the point cloud representation of surfaces in the space. In one example, surfaces in the model may be displayed as groups of points corresponding to different surfaces in the space. In other examples, different clusters of points corresponding to different objects may be identified, and the model may then illustrate solid surfaces of objects as opposed to individual points. The displayed model may also incorporate sensor data from other types of sensors, such as visual cameras.

Figure 5A:
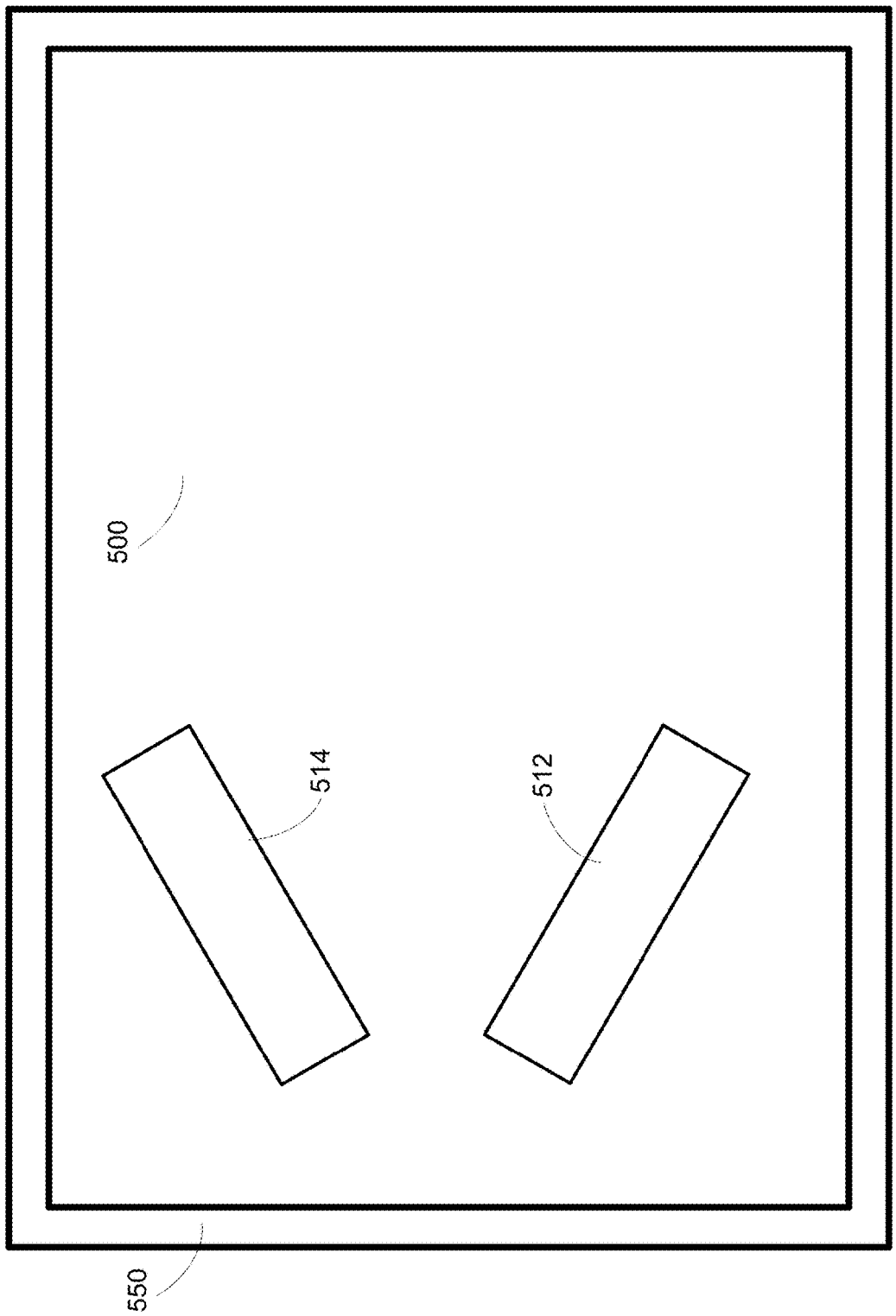
FIGS. 5A, 5B, 5C, 5D, 5E, and 5F illustrate example graphical interfaces, according to example embodiments.

FIG. 5A illustrates an example graphical interface, according to an example embodiment. More specifically, a model of a portion of an environment 500 may be represented graphically on a display screen 550. The display screen 550 could be a screen of a computer, a touchpad device, or a different type of device.

The displayed model may be 2D representation of an overhead view of surfaces in the space. For instance, surfaces 512 and 514 may correspond to objects within the space 500, such as shelves 412 and 414 from FIG. 4. To show an overhead view, surfaces may be orthographically projected onto a flat horizontal surface, such as a floor of the space. In some examples, the model may initially be displayed as an overhead 2D view, but may allow a user to change the point-of-view to display surfaces in the space as 3D shapes (e.g., by changing the position and/or orientation of the point of view shown in the display). A user may therefore be provided with an interface that allows the user to virtually navigate through the space to view the point cloud and/or detected surfaces in the space.

Referring back to FIG. 3, method 300 may further involve receiving input data indicating one or more positions for one or more virtual sensors on the graphical interface, as shown by block 306. More specifically, input data from an input device may indicate positions on a screen at which to position one or more virtual sensors. The virtual sensors may be graphically illustrated at the chosen positions within the displayed model of surfaces in the environment. The input data may be associated with input actions on one or more input devices, such as mouse clicks, touch screen touches, or audible input. For instance, when a user touches different points on a displayed model of an environment on a touchscreen, virtual sensors may be placed at the touched points. If the user touches a particular sensor and drags the sensor, the virtual sensor may then be repositioned on the screen.

The chosen positions for virtual sensors on the screen may correspond to physical positions in the space. For instance, placement of a virtual sensor in the bottom right corner of a screen may correspond to a physical position at the southeast corner of the space. If the displayed model is a 2D model, the X-Y position of a sensor may correspond to X-Y coordinates in the physical space. The Z position of the sensor may default to the ceiling or a different mounting surface for sensors in the space. In other examples, full X, Y, and Z coordinates may be specified by input data. A computing system may verify that it is possible to place a sensor at the chosen position. If not, an error message may be generated. In another example, the interface may restrict the placement of virtual sensors to specific surfaces in the environment, such as the ceiling, walls, or floor.

In some examples, the virtual sensors may each correspond to the same type of physical sensor. In particular, each virtual sensor may correspond to a Lidar sensor. The Lidar sensors may have 360 degrees of view (e.g., a 2D omnidirectional laser scanner that sweeps through a full 360 degrees). In other examples, the sensors may be different types of sensors, such as visual cameras or depth cameras. In some cases, the sensors may be fixed and have a limited field of view. In such cases, the orientation of the sensors may be specified with input data in addition to the position within the space. In further examples, multiple virtual sensors corresponding to multiple different types of physicals sensors (possibly having different fields of view) may be selected and positioned with input data.

Figure 5B:
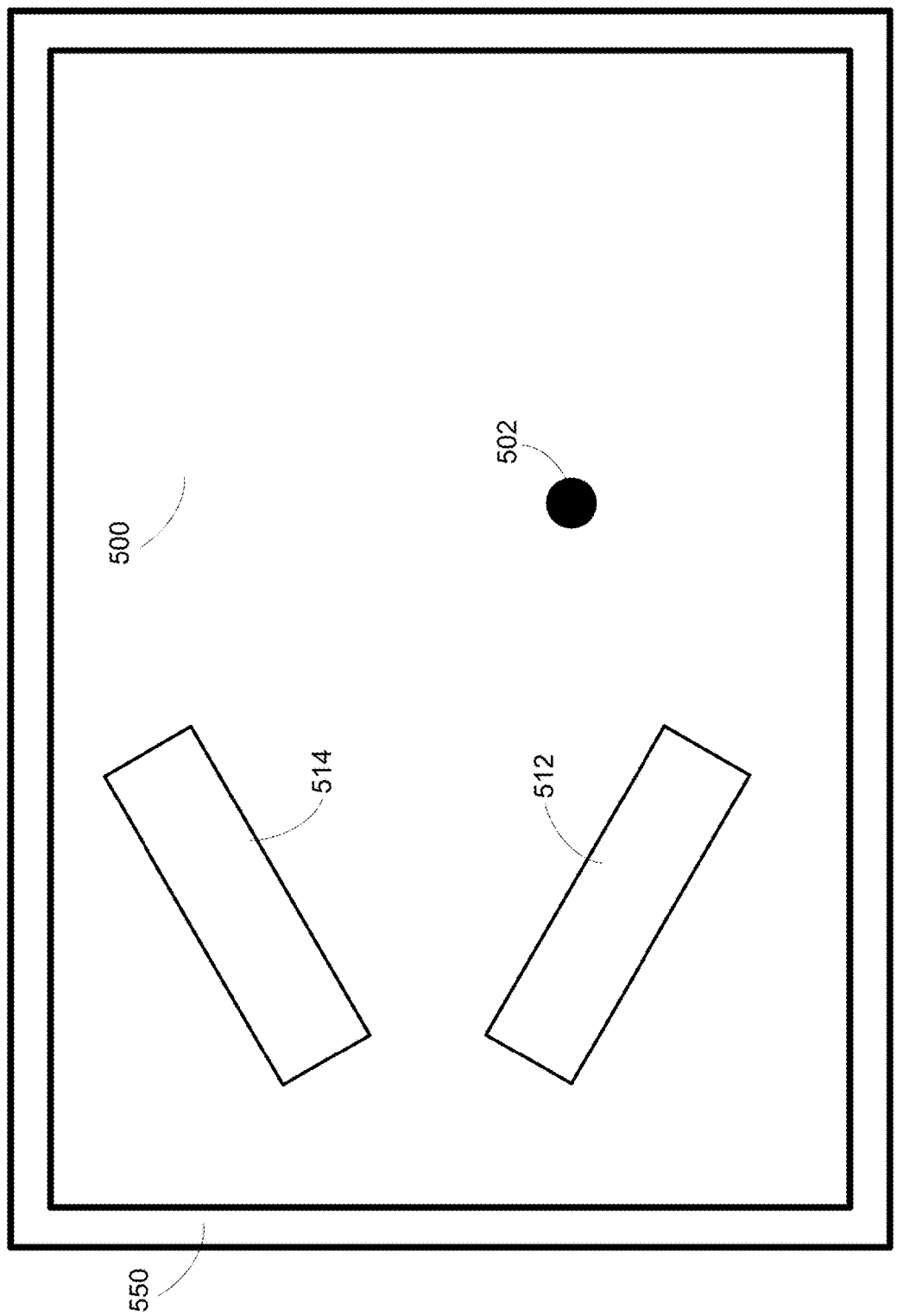

FIG. 5B illustrates placement of a virtual sensor within a displayed model of a space, according to an example embodiment. More specifically, a virtual sensor 502 may be placed at a selected position within a portion of the environment 500 displayed on display device 550. The position for virtual sensor 502 may be selected based on input data such as a mouse click or touchpad touch. A user may select different positions for the virtual sensor 502 in order to view a simulation of predicted occluded areas resulting from existing surfaces in the environment 500, such as shelves 512 and 514.

The position of virtual sensor 502 may correspond to a location within environment 500. In particular, the virtual sensor 502 may have the same relative position to shelves 512 and 514 as a prospective physical sensor that could be placed at the corresponding physical location in the environment 500. In some examples, the Z position of the virtual sensor 502 may be automatically fixed to correspond to a ceiling or other surface of environment 500. In other examples, the Z position of the virtual sensor 502 may be selected through the interface with input data.

Referring back to FIG. 3, method 300 may further involve determining one or more occluded regions within the environment, as shown by block 308. More specifically, the occluded regions may be volumes within the space that are predicted to be occluded from view by one or more physical sensors if the physical sensors are positioned at the physical locations which correspond to the positions for virtual sensors selected in the interface. Predictions of occluded regions for a given set of sensors may be made using the point cloud representation of the space. Accordingly, a denser and more precise point cloud representation may lead to more precise predictions of the occluded regions in the space.

In one example, the space may be divided into voxels (e.g., cubic volumes with sides of 10 centimeter length). Occluded volumes within the space may then be predicted by casting virtual rays from the center point of each voxel to each proposed location for a sensor in the space. A particular voxel may be identified as being occluded from view by a particular sensor if the virtual ray cast from the particular voxel to the particular sensor comes close to (e.g., within a threshold distance of) one or more points in the point cloud representation of the space before hitting the sensor. In that case, it may be predicted that the environment contains a surface corresponding to the nearby points which will likely block the sensor from viewing the particular region. The ray casting process may be repeated from each voxel in the space to each of the sensors. If a given voxel is predicted to be occluded from all of the sensors, the given voxel may be predicted to be part of the occluded region in the space.

In a further example, the ray casting process may be made faster by using an octree that contains the points from the point cloud representation of the surfaces within the environment. An octree is a tree data structure in which each internal node has eight children. The octree may be used to partition the three dimensional space by recursively subdividing it into eight octants. When a ray is cast, candidate points to test for proximity to the ray may be identified by searching the octree. Accordingly, first determining an octree data structure corresponding to the point cloud representation of the space may improve the speed at which occluded regions are predicted.

In an additional example, occluded regions for a particular virtual sensor may be predicted by projecting the world onto a flat plane from the particular virtual sensor's point of view. More specifically, a virtual depth image for the virtual sensor may be determined by projecting the points from the point cloud representation of surfaces within the environment onto the plane. For each pixel in the virtual depth image, a nearest projected point from the point cloud representation may be stored. The occlusion test may then involve comparing expected depth values for voxels within the space (e.g., center points of the voxels or the entire projected areas of the voxels) with corresponding portions of the virtual depth image. If the value in the virtual depth image for a given voxel is further than the expected depth value, the given voxel may be predicted to be visible by the particular sensor. If the value in the virtual depth image for the given voxel is closer than the expected depth value, the given voxel may be predicted to be occluded from view by the particular sensor. The process may be repeated for each sensor to predict the overall occluded region.

Method 300 may further involve providing for display in the graphical interface of a graphical representation of the one or more occluded regions, as shown by block 310. More specifically, the occluded regions may be illustrated within the displayed model of surfaces within the environment in order to provide an intuitive understanding of what areas of the space will not be covered by a proposed placement of one or more virtual sensors.

In some examples, the model may be a 3D graphical representation and a 3D graphical representation of the occluded regions may also be displayed. In particular, the occluded regions may be overlaid on top of the model. An input mechanism may be provided to allow the user to change the point of view of the interface. In this manner, the user may view with precision the volumes of the space predicted to be occluded from view by a given placement of sensors within the space.

In further examples, the model may be a 2D graphical representation and a 2D graphical representation of the occluded regions may also be displayed. In one example, a 2D X-Y location may be treated as occluded if at least one voxel at the X-Y location is predicted to be occluded. In another example, a 2D X-Y location may be treated as occluded if at least one voxel at the X-Y location within a certain height range (e.g., between 2 feet and 6 feet above ground) is predicted to be occluded. In a further example, a 2D X-Y location may be treated as occluded if at least a certain predetermined number of voxels at the X-Y location are predicted to be occluded from view.

Figure 5C:
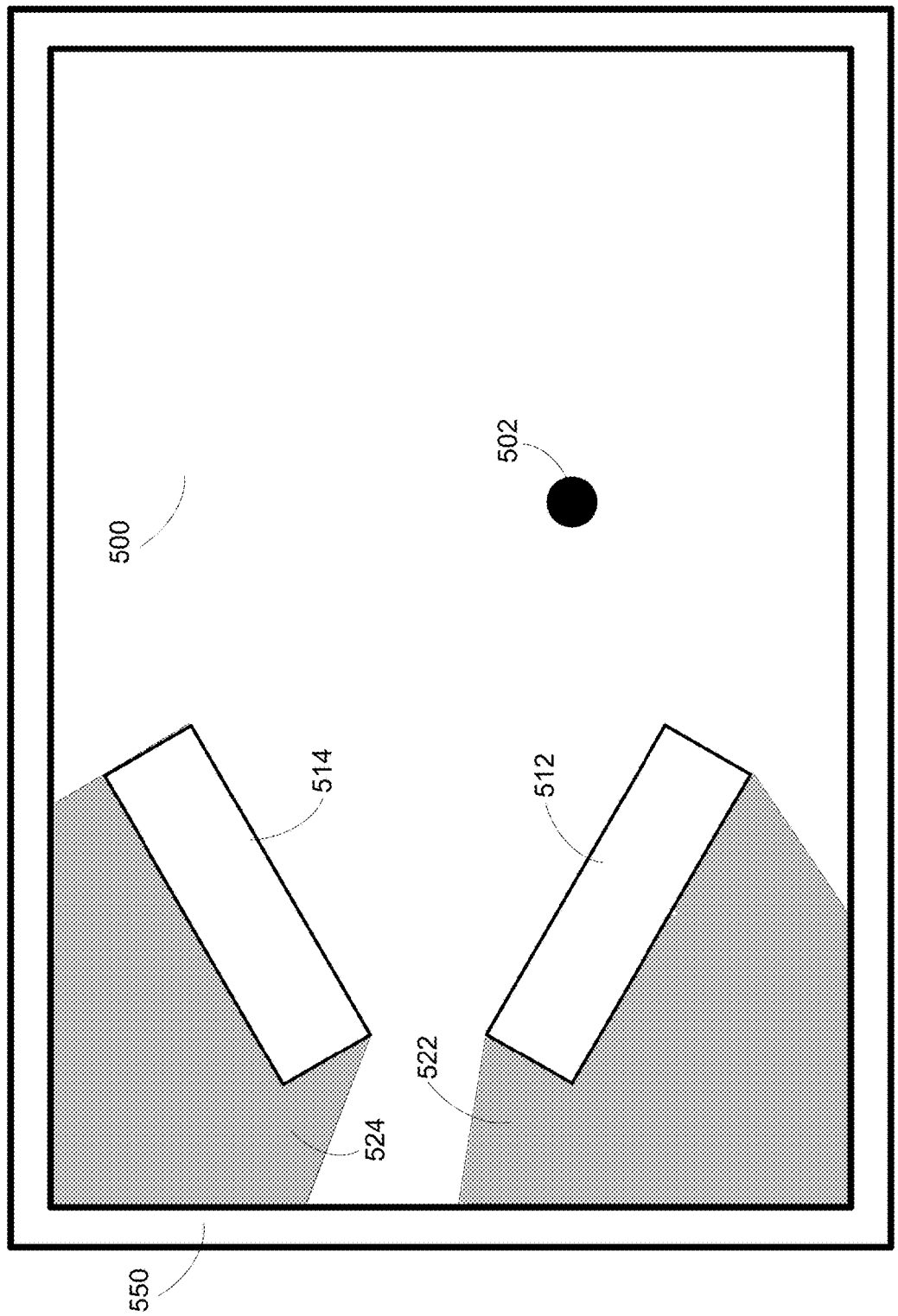

FIG. 5C illustrates a graphical representation of occluded regions, according to an example embodiment. More specifically, after virtual sensor 502 is placed within the portion of environment 500 displayed on display device 550, occluded regions may be determined for the selected position of virtual sensor 502. In one example, a ray casting process may be used from the position of virtual sensor 502 to determine what regions of the space 500 are predicted to be occluded from view as a result of objects in the space, such as shelves 512 and 514. In particular, occluded region 522 may be predicted to be occluded from view by sensor 502 as a result of shelf 512. Additionally, occluded region 524 may be predicted to be occluded from view by sensor 502 as a result of shelf 514.

The predicted occluded regions 522 and 524 may then be graphically displayed within the graphical user interface. For instance, the occluded regions 522 and 524 may be displayed as shaded regions while the viewable regions of space 500 may not be shaded. The occluded regions may be indicated graphically in other ways as well. As another example, the occluded regions 522 and 524 may be represented as 3D volumes in the display.

The displayed occluded regions 522 and 524 may be updated automatically if input data is provided that indicates to adjust the position of virtual sensor 502 within the displayed portion of environment 500. For instance, the interface may allow a user to drag the virtual sensor 502 to a different position in the displayed representation of the room, and a computing device may responsively update the graphical representations of the occluded regions 522 and 524 based on the new position of virtual sensor 502. In this manner, an example system may allow a user to simulate many different predicted occluded regions for many different placements of a virtual sensor in a matter of seconds or minutes.

Figure 5D:
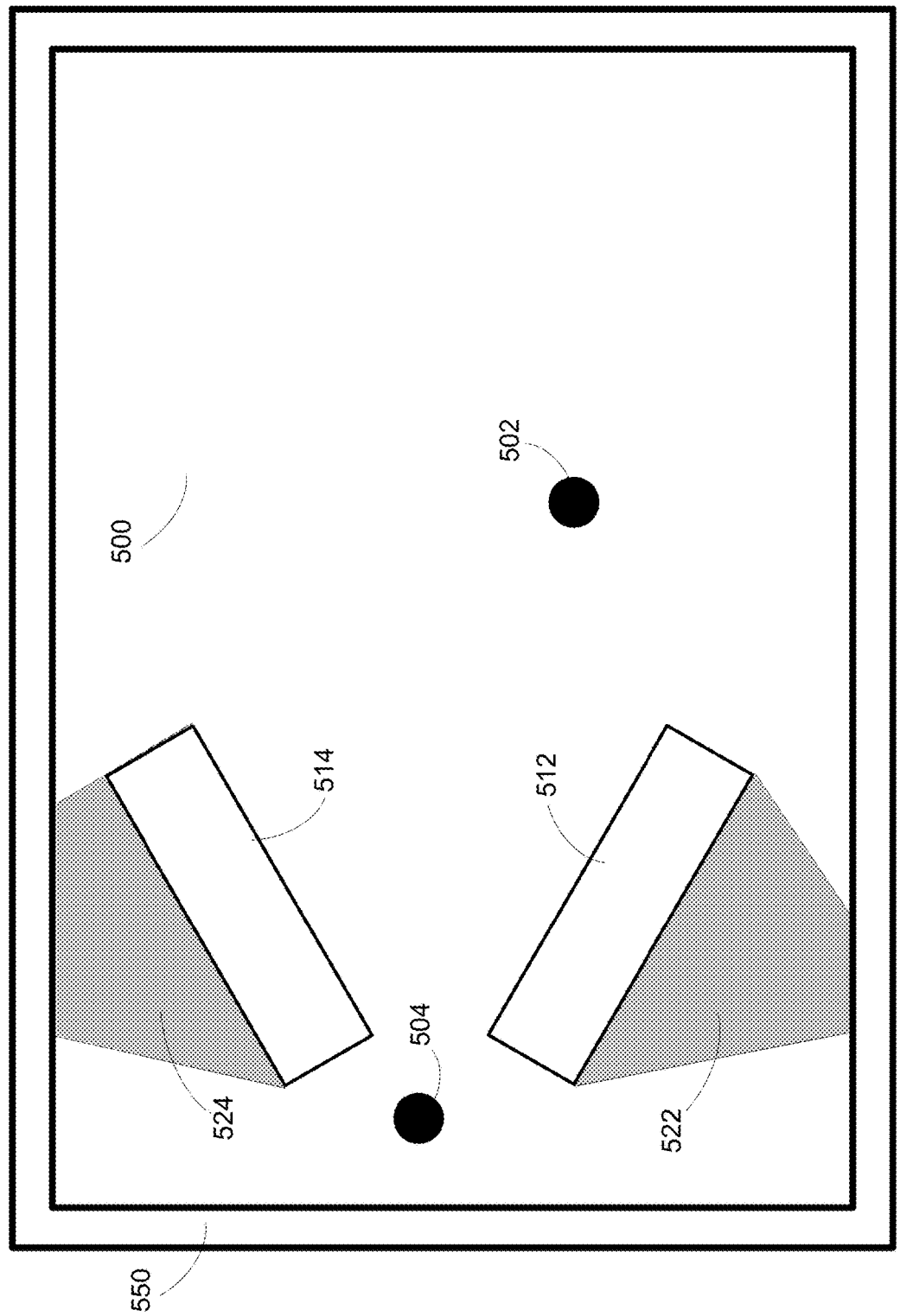

FIG. 5D illustrates an interface with two virtual sensors, according to an example embodiment. More specifically, after placing virtual sensor 502 within the displayed model of the environment 500 shown on display device 550, additional input data may be provided by a user to place a second virtual sensor 504. A simulation may then be run to update the predicted occluded regions 522 and 524 resulting from obstacles 512 and 514 in the environment 500.

In particular, occluded regions 522 and 524 are displayed as the regions predicted to be occluded from view by both a first physical sensor corresponding to virtual sensor 502 and a second physical sensor corresponding to virtual sensor 504. Occluded regions 522 and 524 may each have a reduced volume resulting from the additional coverage predicted to be provided by virtual sensor 504. Providing for a dynamic graphical representation of the occluded regions in response to input data from the user indicating placements of virtual sensors may provide a user with an intuitive sense of the value of installing additional sensors, such as a physical sensor corresponding to virtual sensor 504.

Figure 5E:
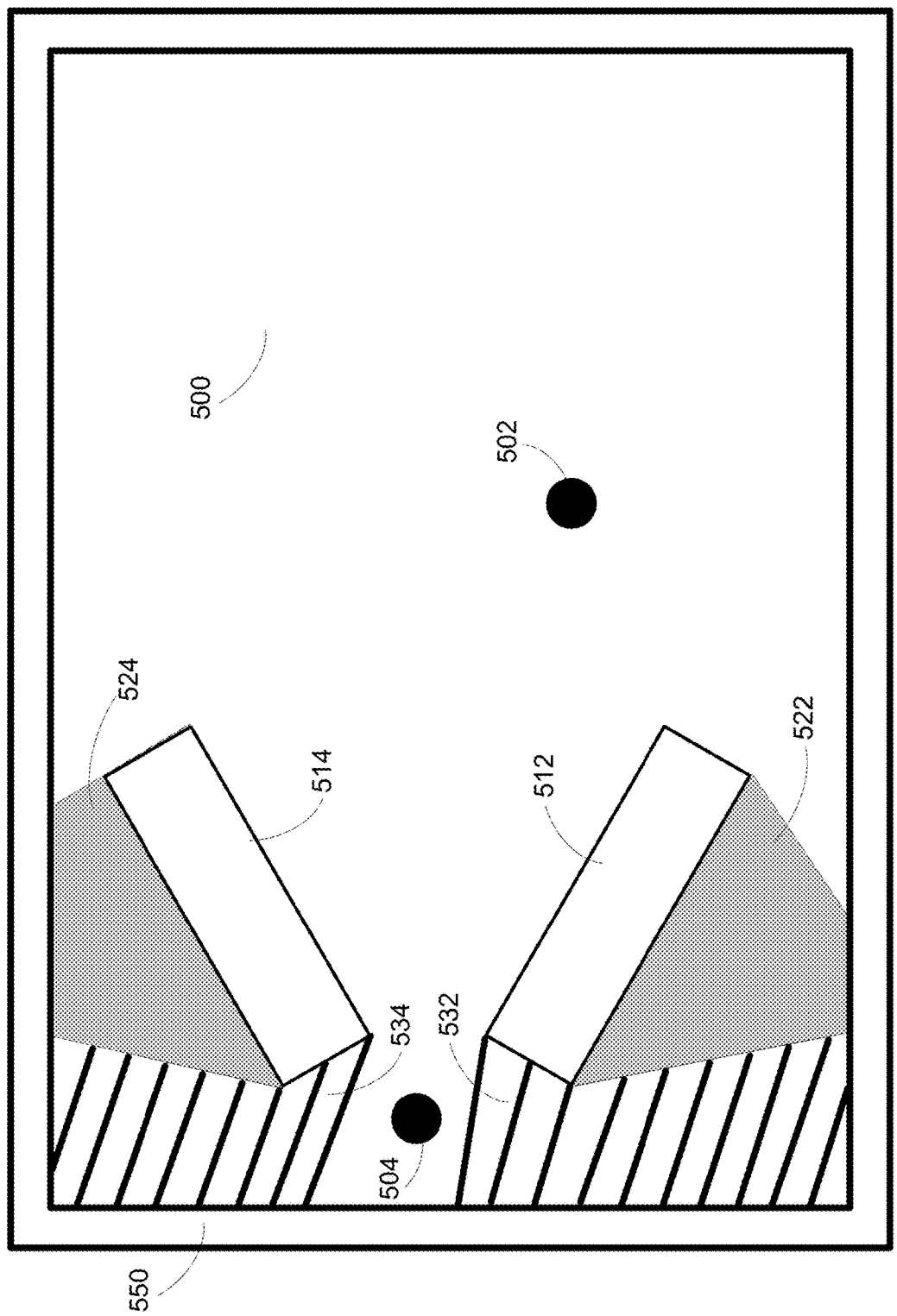

FIG. 5E illustrates an interface that shows both predicted occluded regions and additional coverage regions provided by an additional sensor, according to an example embodiment. More specifically, when virtual sensor 504 is placed within the displayed model of the environment 500 shown on display device 550, a graphical representation of additional coverage regions 532 and 534 predicted to be covered by a physical sensor corresponding to virtual sensor 504 may also be displayed. In particular, the additional coverage regions 532 and 534 may be regions predicted to be in view of virtual sensor 504 that were previously subregions of the occluded regions 522 and 524. In addition to updating the representation of the occluded regions 522 and 524, a representation of the additional coverage regions 532 and 534 may also be displayed to provide a direct representation of the added value of an additional sensor in covering areas that were previously occluded. In other examples, only the additional coverage regions 532 and 534 may be displayed when virtual sensor 504 is placed, rather than modifying the displayed occluded regions 522 and 524.

Figure 5F:
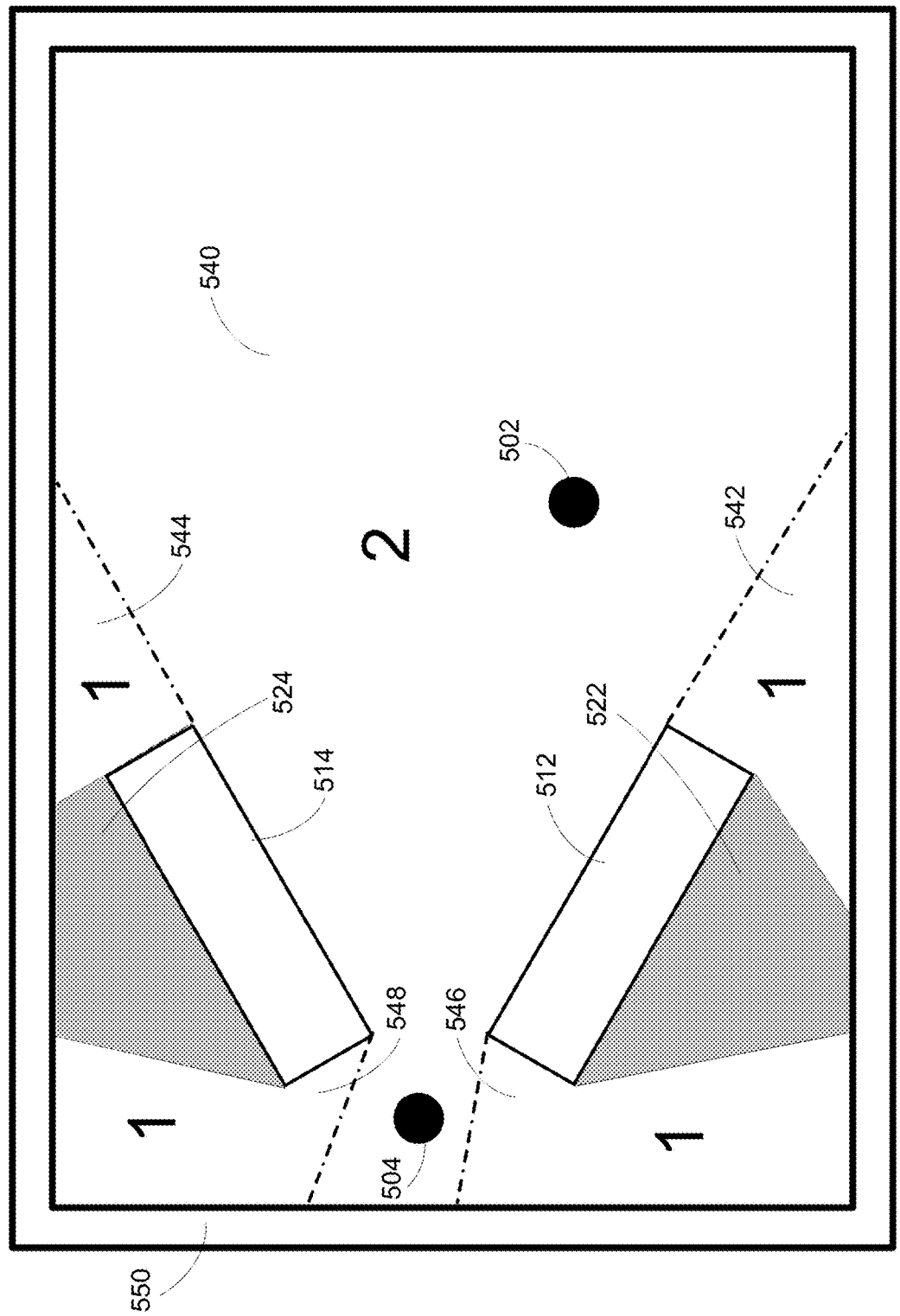

FIG. 5F illustrates another type of interface, according to an example embodiment. In this example, an indication of a number of sensors predicted to have a view of respective subregions within a space is provided on a display interface. More specifically, after the placement of virtual sensors 502 and 504 within the portion of environment 500 displayed on display interface 550, a prediction may be made about whether particular volumes are viewable by only one of virtual sensor 502 and 504, by both virtual sensor 502 and 504, or by neither virtual sensor 502 or 504. In one example, the prediction may be made per voxel, and then neighboring voxels viewable by the same number of sensors may be combined to form the displayed regions.

In this case, occluded regions 522 and 524 may be predicted to be occluded from view by both virtual sensors 502 and 504. Region 540 may be predicted to be viewable by both virtual sensors 502 and 504. Regions 542, 544, 546, and 548 may be predicted to be viewable by exactly one of virtual sensors 502 and 504. The indications of the number of sensors that are predicted to be able to view different regions may be displayed graphically in other ways as well. For instance, the regions may be color-coded (e.g., red for occluded regions, yellow for regions viewable by one sensor, green for regions viewable by both sensors).

The example illustrated in FIG. 5F may also be expanded for the placement of more than two virtual sensors. Displaying an indication of the number of sensors that can view respective regions may be particularly useful when many virtual sensors are placed (e.g., 20 sensors or 100 sensors). In this manner, an indication is provided of how much coverage is provided in different areas in addition to which areas are not covered at all. For instance, it may be desirable for a user to have overlapping coverage from two or more sensors in certain areas in case one or more of the sensors become occluded by a moving object or simply malfunction.

Figure 6A:
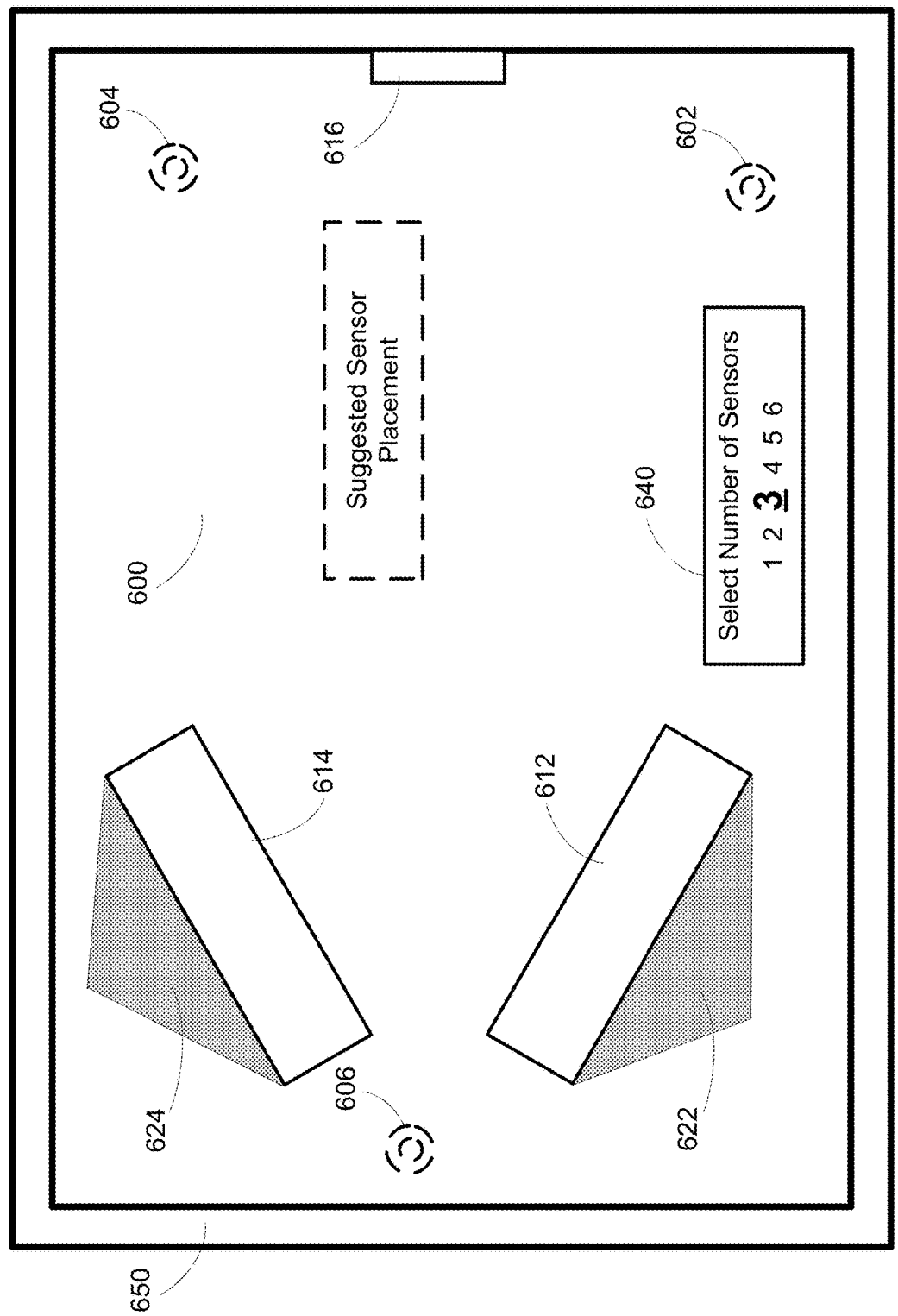
FIGS. 6A and 6B illustrate additional example graphical interfaces, according to example embodiments.

FIG. 6A illustrates an interface that displays a suggested sensor placement, according to an example embodiment. More specifically, a computing system may determine one or more different possible placements of a chosen number of sensors to provide suggested placements to a user. In this example, display device 650 may be controlled to display a model of environment 600 containing obstacles 612 and 614. In addition, environment 600 may contain an entryway 616, such as a doorway, that allows entities such as people to enter or leave the space.

In this example, a menu 640 may be provided to allow for the selection of a number of virtual sensors to place within the display interface. In this case, a user may select to place three virtual sensors within the space in order to visualize possible placements of the three sensors and corresponding occluded regions.

A computing system may then autonomously determine one or more suggested sensor placements. In some examples, the sensor placements may be generated in order to minimize the total volume of occluded space. In other examples, the sensor placements may be generated in order to satisfy one or more other goals. For instance, a suggested sensor placement may be generated to provide a certain amount of coverage (e.g., at least two sensors) around entryways of the space. In some cases, the entryways may be identified by user input data. In other examples, an entryway may be autonomously identified based on sensor data collected over time which indicates that entities have appeared or disappeared from the region through the entryway.

In FIG. 6A, a suggested sensor placement of three virtual sensors 602, 604, and 606 is displayed. In addition, occluded regions 622 and 624 which are predicted to be occluded from view by physical sensors positioned according to the suggested sensor placement of virtual sensors 602, 604, and 606 may also be displayed. In this example, input data may be provided from a user to confirm a particular suggested sensor placement, or to adjust one or more sensor positions from the suggested placement.

In other examples, a plurality of suggested sensor placements may be available via a user interface. In particular, each suggested sensor placement may be determined to satisfy different goals. For instance, the suggested sensor placement shown in FIG. 6A may be chosen to provide a certain amount of coverage around entryway 616. An alternative suggested sensor placement may be provided to minimize or eliminate occluded regions, but may not provide as much coverage around entryway 616. A user may be provided with a mechanism to select between suggested arrangements of sensors to view different possibilities. In another example, a user may be provided with an input mechanism to weight different goals (e.g., providing extra coverage around entryways, minimizing occluded regions). A suggested sensor placement may then be generated based on the goal weights and the suggested sensor placement may be displayed to the user.

Figure 6B:
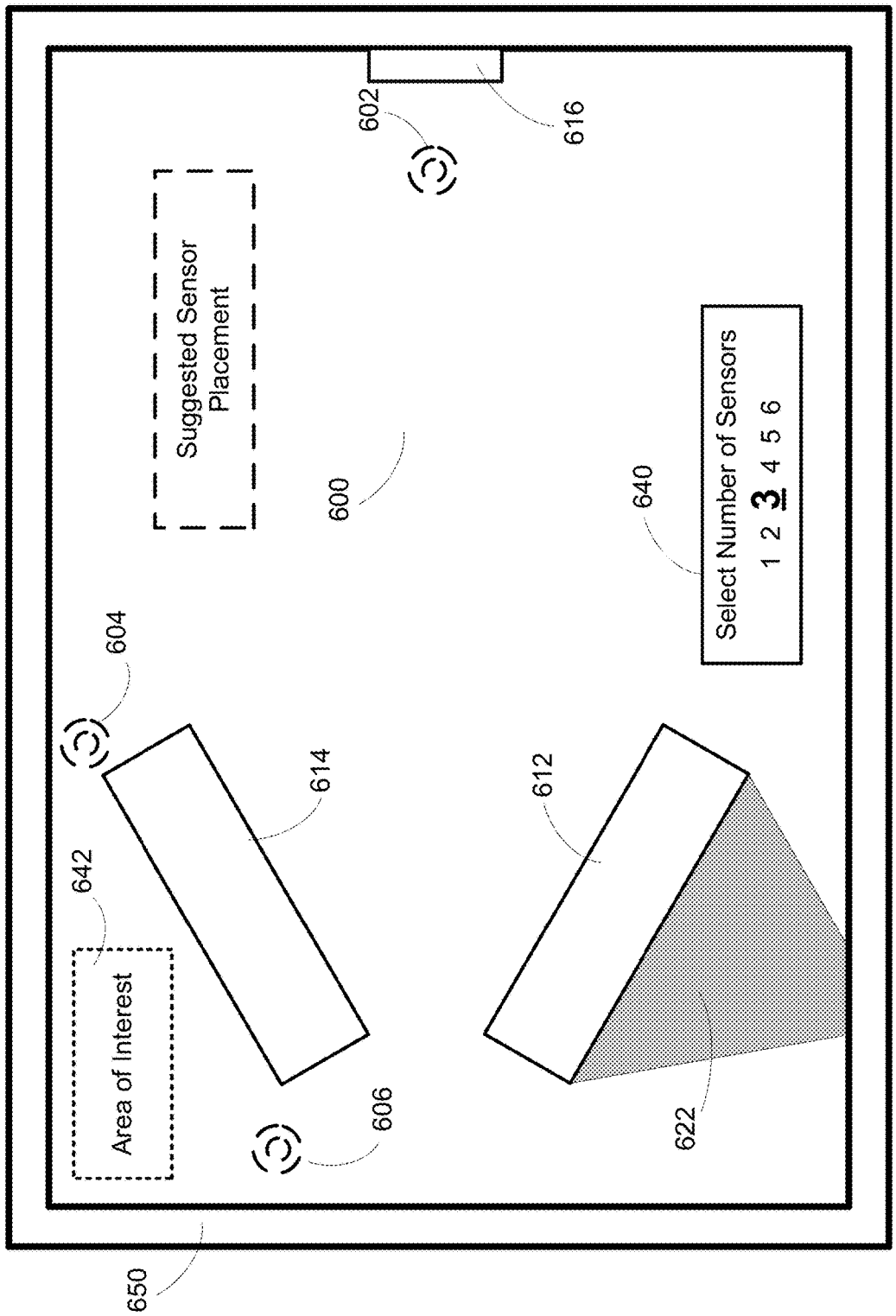

FIG. 6B shows an interface that allows for an area of interest to be chosen, according to example embodiment. More specifically, a user may be provided with an input mechanism to select areas to focus coverage on. A suggested sensor placement may then be generated which focuses on the chosen areas of interest. This type of interface may be useful when it may not be possible for a computing system to accurately determine the most important areas of coverage (e.g., for a particular store manager).

As shown in FIG. 6B, a box 642 may be drawn over a portion of environment 600 indicating an area of interest to focus sensor coverage. A suggested sensor placement of sensors 602, 604, and 606 may then be generated based on the chosen area of interest 642. For instance, the suggested sensor placement may be chosen to provide at least two sensors (sensors 604 and 606) which have a view of area of interest 642. The suggested sensor placement may come at the cost of an increase in the area of occluded region 622 as well as reduced sensor coverage around entryway 616. By providing a suggested sensor placement as well as a simulation of the predicted coverage areas, the interface shown in FIG. 6B may facilitate the decision-making process of a user in placing sensors throughout environment 600.

In another example, input data may be provided by a user that fixes the position of certain virtual sensors. Suggested placements of other virtual sensors may then be displayed given the fixed selections by the user. For instance, a user may place two virtual sensors at two positions in a space. A suggested placement of a third virtual sensor may be automatically generated and displayed that attempts to minimize occluded regions given the selections already made by the user. Placing sensors using a graphical interface may therefore involve a collaborative process between a user and an automated system.

In a further example, a system may be provided that includes a communication interface to receive sensor data from one or more physical sensors in a space. When a physical sensor is installed, sensor data from the physical sensor may be used to update a graphical interface in order to facilitate the placement of additional sensors. In this manner, placement of sensors may be an iterative process that incorporates actual data from physical sensors when the sensors come online to increase the precision of displayed information and the precision of predictions made for additional virtual sensor placements.

As an example, five virtual sensors may be placed within a user interface, and corresponding predicted occluded regions may be graphically displayed. The user may then select a single physical sensor to install at a location in the environment corresponding to one of the five virtual sensors. When an indication is received that the physical sensor is online, an indication of the location of the physical sensor may be displayed within the graphical interface. Additionally, actual depth sensor data from the physical sensor may be used to determine what regions are viewable by the physical sensor and what regions are occluded. Depth data from the sensor may be used to update the point cloud representation of the space and/or the displayed model of surfaces in the environment, particularly when one or more features of the background have changed. Additionally, depth data from the sensor may be used to update the display to show the actual coverage regions and occluded regions for the sensor instead of the predicted regions.

After the updated model and/or occluded regions are displayed, one or more positions of the remaining four virtual sensors may be adjusted before additional physical sensors are installed. For instance, a graphical indication may be provided showing that a certain region which was predicted to be viewable by the first installed physical sensor is actually occluded from view by the sensor. A user may then adjust the placement of one of the remaining virtual sensors to ensure coverage in the identified region. The graphical interface may also be controlled to display a comparison between predicted coverage or occluded regions and actual coverage or occluded regions as each physical sensor is installed within the environment and comes online.

In a further example, an indication may be received that particular sensor has gone offline. A computing system may then identify additional occluded regions that were previously visible only by the particular sensor. The additional occluded regions may be displayed graphically to the user. In this manner, the system may provide dynamic assistance to a user in maintaining sensor coverage within an environment. For instance, after learning that a particular sensor has failed and seeing the resulting loss in coverage, a user may position one or more additional virtual sensors within the interface to determine how best to compensate for the loss.

In an additional example, occluded regions may be displayed to a user as part of a virtual reality presentation. In particular, the system may provide an immersive experience that allows a user to navigate through the model of surfaces in the environment and the occluded areas. Such an experience may provide a more intuitive notion of the sizes and locations of occluded areas within a space for a chosen placement of virtual sensors.

In another example, occluded regions may be displayed to a user as part of an augmented reality presentation. In particular, a user may be provided with an HMD to wear as the user navigates through the physical environment. In that manner, the user may be able to view the actual surfaces in the environment rather than a model. Additionally, occluded regions may be virtually overlaid within the display of the HMD to provide the user with an indication of the occluded regions for a given placement of virtual sensors as the user moves through the space.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:

determining a point cloud representation of surfaces within an environment;

providing for display of a graphical interface that shows a model of the surfaces within the environment based on the point cloud representation;

receiving input data indicating a position for a virtual sensor on the graphical interface corresponding to a physical position within the environment;

determining a virtual depth image for the virtual sensor by projecting the point cloud representation onto a plane that corresponds to a point of view of the virtual sensor, wherein each pixel within the virtual depth image represents a depth of a nearest projected point from the point cloud;

comparing (i) expected depth values of a plurality of voxels located within the environment to (ii) corresponding portions of the virtual depth image;

identifying, based on the comparison and for the virtual sensor, a subset of voxels of the plurality of voxels for which the corresponding portions of the virtual depth image are closer to the plane than the expected depth values;

based on the identified subset of voxels for the virtual sensor, making a prediction that the subset of voxels will be occluded from a sensor positioned at the physical position within the environment; and based on the prediction, providing for display in the graphical interface of a graphical representation of an occluded region that includes the subset of voxels within the model of the surfaces within the environment;

receiving additional input data indicating a number of additional sensors to position within the environment;

determining a plurality of suggested arrangements of the number of additional sensors within the environment, wherein each respective arrangement of the plurality of suggested arrangements indicates positions for additional virtual sensors on the graphical interface corresponding to additional physical positions within the environment, and wherein each respective arrangement is associated with a corresponding objective attained by the respective arrangement;

determining, based on the point cloud representation of the surfaces of the environment and for each respective arrangement, an updated occluded region within the environment, wherein the updated occluded region is predicted to be occluded from view by (i) the sensor positioned at the physical position within the environment and (ii) the additional sensors positioned at the additional physical positions within the environment according to the respective arrangement; and for each respective arrangement, providing for display in the graphical interface of (i) a visual layout of the respective arrangement, (ii) the corresponding objective attained by the respective arrangement, and (iii) the updated occluded region for the respective arrangement.

2. The method of claim 1, wherein the model of the surfaces within the environment comprises a three-dimensional model and wherein the graphical representation of the occluded region comprises a three-dimensional representation.

3. The method of claim 1, wherein the model of the surfaces within the environment comprises a two-dimensional model and wherein the graphical representation of the occluded region comprises a two-dimensional representation.

4. The method of claim 1, wherein the sensor comprises a 360-degree Lidar sensor, and wherein the occluded region is predicted to be occluded from view by the 360-degree Lidar sensor.

5. The method of claim 1, further comprising:

determining, based on the point cloud representation of the surfaces of the environment, one or more overlapping regions within the environment, wherein the one or more overlapping regions are predicted to be viewable by each of two sensors positioned at two physical positions within the environment; and providing for display in the graphical interface of a graphical representation of the one or more overlapping regions within the model of the surfaces within the environment.

6. The method of claim 5, wherein the graphical representation of the one or more overlapping regions further comprises a sensor number indicator, wherein the sensor number indicator for a particular overlapping region depends on a number of sensors for which the particular overlapping region is viewable.

7. The method of claim 1, further comprising:

receiving further input data indicating a further position for a further virtual sensor on the graphical interface corresponding to a further physical position within the environment;

determining a predicted additional coverage region for a sensor positioned at the further physical position in the environment, wherein the predicted additional coverage region comprises a subregion of the occluded region; and providing for display in the graphical interface of a graphical representation of the predicted additional coverage region within the model of the surfaces within the environment.

8. The method of claim 1, further comprising:

receiving an indication that a physical sensor has been installed within the environment;

receiving, from the physical sensor, sensor data indicative of the surfaces within the environment;

adjusting the point cloud representation of the surfaces within the environment based on the received sensor data; and providing for display in the graphical interface of an adjusted model of the surfaces within the environment based on the adjusted point cloud representation.

9. The method of claim 1, further comprising:

receiving an indication that a physical sensor has been installed within the environment;

receiving, from the physical sensor, sensor data indicative of the environment;

identifying a portion of the received sensor data that is indicative of the occluded region within the environment;

adjusting the occluded region based on the identified portion of the received sensor data; and providing for display in the graphical interface of the adjusted occluded region within the model of the surfaces within the environment.

10. The method of claim 1, further comprising:
receiving further input data indicating a selection of a particular arrangement of the plurality of suggested arrangements; and
in response to reception of the further input data, providing for display in the graphical interface of (i) the visual layout of the particular arrangement, (ii) the corresponding objective attained by the particular arrangement, and (iii) the updated occluded region for the particular arrangement.

11. The method of claim 1, further comprising:
receiving further input data indicating one or more areas of interest within the environment; and
determining the plurality of suggested arrangements of the number of additional sensors within the environment further based on the one or more areas of interest.

12. The method of claim 1, further comprising:
identifying one or more entryways of the environment; and
determining the plurality of suggested arrangements of the number of additional sensors within the environment further based on the one or more identified entryways.

13. The method of claim 1, further comprising:
verifying the prediction by, for each respective voxel of the plurality of voxels, (i) casting a virtual ray from a center point of the respective voxel to the physical position within the environment, (ii) determining that the virtual ray comes within a threshold distance of a point from the point cloud representation, and (iii) based on determining that the virtual ray comes within the threshold distance of the point, determining that the respective voxel will be occluded from the sensor positioned at the physical position within the environment.

14. The method of claim 1, wherein the corresponding objective is one or more of (i) providing a minimum amount of coverage of doorways in the environment, (ii) minimizing a total occluded fraction of the environment given the number of additional sensors, or (iii) providing a minimum amount of coverage of selected regions within the environment.

15. A system comprising:
a display device; and
one or more processors; and
a non-transitory computer-readable medium, configured to store instructions, that when executed by the one or more processors, cause the system to perform functions comprising:
determining a point cloud representation of surfaces within an environment;
providing for display on the display device of a graphical interface that shows a model of the surfaces within the environment based on the point cloud representation;
receiving input data indicating a position for a virtual sensor on the graphical interface corresponding to a physical position within the environment;
determining a virtual depth image for the virtual sensor by projecting the point cloud representation onto a plane that corresponds to a point of view of the virtual sensor, wherein each pixel within the virtual depth image represents a depth of a nearest projected point from the point cloud;
comparing (i) expected depth values of a plurality of voxels located within the environment to (ii) corresponding portions of the virtual depth image;
identifying, based on the comparison and for the virtual sensor, a subset of voxels of the plurality of voxels for which the corresponding portions of the virtual depth image are closer to the plane than the expected depth values;
based on the identified subset of voxels for the virtual sensor, making a prediction that the subset of voxels will be occluded from a sensor positioned at the physical position within the environment;
based on the prediction, providing for display in the graphical interface of a graphical representation of an occluded region that includes the subset of voxels within the model of the surfaces within the environment;
receiving additional input data indicating a number of additional sensors to position within the environment;
determining a plurality of suggested arrangements of the number of additional sensors within the environment, wherein each respective arrangement of the plurality of suggested arrangements indicates positions for additional virtual sensors on the graphical interface corresponding to additional physical positions within the environment, and wherein each respective arrangement is associated with a corresponding objective attained by the respective arrangement;
determining, based on the point cloud representation of the surfaces of the environment and for each respective arrangement, an updated occluded region within the environment, wherein the updated occluded region is predicted to be occluded from view by (i) the sensor positioned at the physical position within the environment and (ii) the additional sensors positioned at the additional physical positions within the environment according to the respective arrangement; and
for each respective arrangement, providing for display in the graphical interface of (i) a visual layout of the respective arrangement, (ii) the corresponding objective attained by the respective arrangement, and (iii) the updated occluded region for the respective arrangement.

16. The system of claim 15, further comprising a depth sensor positioned within the environment, wherein the functions further comprise:
receiving an indication that the depth sensor is online;
receiving sensor data from the depth sensor indicative of the surfaces within the environment;
adjusting the model of the surfaces within the environment based on received sensor data;
providing for display in the graphical interface of the adjusted model of the surfaces within the environment;
identifying a portion of the received sensor data that is indicative of the occluded region within the environment;
adjusting the occluded region based on the identified portion of the received sensor data; and
providing for display in the graphical interface of the adjusted occluded region within the adjusted model of the surfaces within the environment.

17. The system of claim 16, wherein the functions further comprise:
receiving a second indication that the depth sensor is offline;
identifying one or more additional occluded regions that were previously visible by the depth sensor; and
providing for display in the graphical interface of the identified one or more additional occluded regions within the adjusted model of the surfaces within the environment.

18. The system of claim 15, wherein the corresponding objective is one or more of (i) providing a minimum amount of coverage of doorways in the environment, (ii) minimizing a total occluded fraction of the environment given the number of additional sensors, or (iii) providing a minimum amount of coverage of selected regions within the environment.

19. A non-transitory computer-readable medium configured to store instructions, that when executed by a computing system, cause the computing system to perform functions comprising:

determining a point cloud representation of surfaces within an environment;

providing for display of a graphical interface that shows a model of the surfaces within the environment based on the point cloud representation;

receiving input data indicating a position for a virtual sensor on the graphical interface corresponding to a physical position within the environment;

determining a virtual depth image for the virtual sensor by projecting the point cloud representation onto a plane that corresponds to a point of view of the virtual sensor, wherein each pixel within the virtual depth image represents a depth of a nearest projected point from the point cloud;

comparing (i) expected depth values of a plurality of voxels located within the environment to (ii) corresponding portions of the virtual depth image;

identifying, based on the comparison and for the virtual sensor, a subset of voxels of the plurality of voxels for which the corresponding portions of the virtual depth image are closer to the plane than the expected depth values;

based on the identified subset of voxels for the virtual sensor, making a prediction that the subset of voxels will be occluded from a sensor positioned at the physical position within the environment;

based on the prediction, providing for display in the graphical interface of a graphical representation of an occluded region that includes the subset of voxels within the model of the surfaces within the environment;

receiving additional input data indicating a number of additional sensors to position within the environment;

determining a plurality of suggested arrangements of the number of additional sensors within the environment, wherein each respective arrangement of the plurality of suggested arrangements indicates positions for additional virtual sensors on the graphical interface corresponding to additional physical positions within the environment, and wherein each respective arrangement is associated with a corresponding objective attained by the respective arrangement;

determining, based on the point cloud representation of the surfaces of the environment and for each respective arrangement, an updated occluded region within the environment, wherein the updated occluded region is predicted to be occluded from view by (i) the sensor positioned at the physical position within the environment and (ii) the additional sensors positioned at the additional physical positions within the environment according to the respective arrangement; and for each respective arrangement, providing for display in the graphical interface of (i) a visual layout of the respective arrangement, (ii) the corresponding objective attained by the respective arrangement, and (iii) the updated occluded region for the respective arrangement.

20. The non-transitory computer-readable medium of claim 19, wherein the corresponding objective is one or more of (i) providing a minimum amount of coverage of doorways in the environment, (ii) minimizing a total occluded fraction of the environment given the number of additional sensors, or (iii) providing a minimum amount of coverage of selected regions within the environment.

* * * * *